United States Patent Office 3,532,506
Patented Oct. 6, 1970

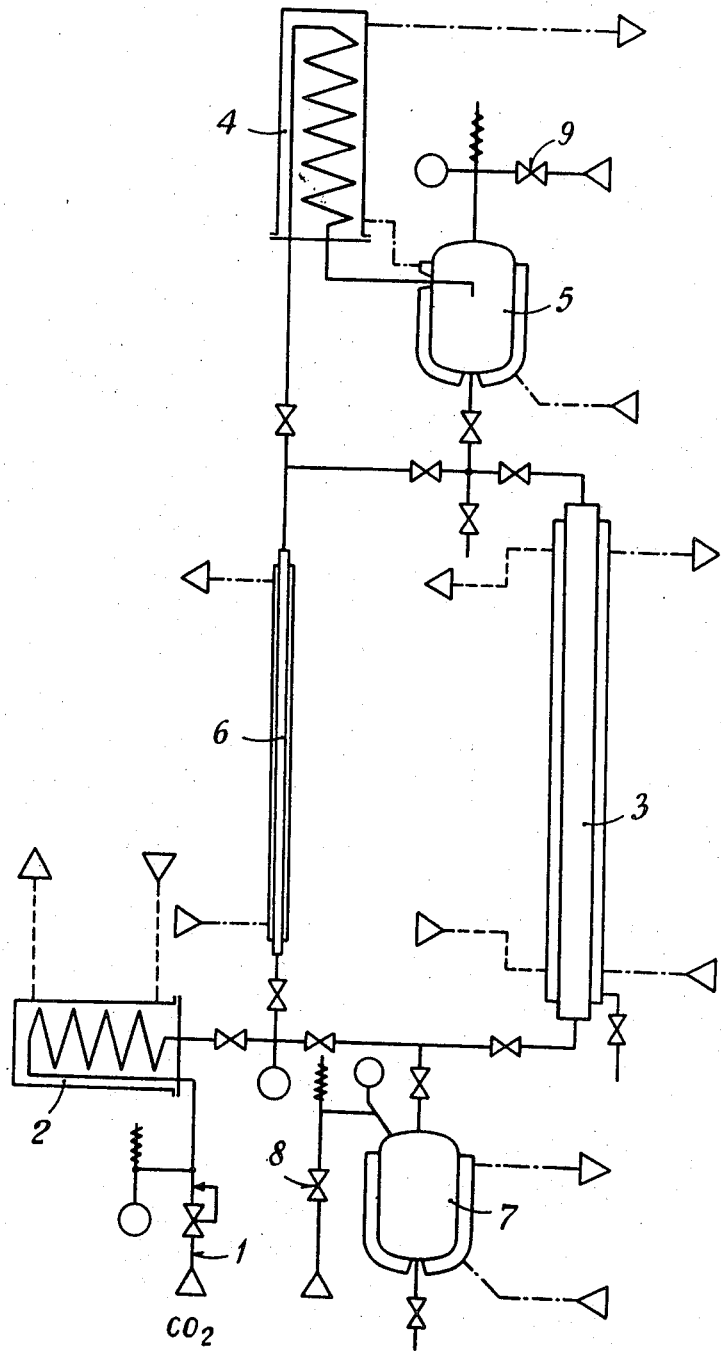

3,532,506
PROCESS FOR PREPARING FREEZE DRIED EXTRACT OF COFFEE, TEA OR CHICORY AND PRODUCT PRODUCED THEREBY
Louis-René Rey and Gérard Pictet, Saint-Legier, and Alfred Morand, La Tour-de-Peilz, Switzerland, assignors to Societe d'Assistance Technique pour Produits Nestle S.A., Lausanne, Switzerland, a corporation of Switzerland
Filed Feb. 13, 1967, Ser. No. 615,728
Claims priority, application Switzerland, Feb. 15, 1966, 2,184/66
Int. Cl. A23f 1/08, 1/14, 3/00
U.S. Cl. 99—71                                  19 Claims

ABSTRACT OF THE DISCLOSURE

An extract of aromatic and fatty constituents from vegetable matter is prepared by extracting the vegetable matter with gaseous or liquid $CO_2$. Such extracts are prepared by flowing gaseous or liquid $CO_2$ through the vegetable matter and collecting the extract in solution in liquid $CO_2$. $CO_2$-soluble extracts are used to aromatize aqueous extractives subsequently obtained from the $CO_2$-extracted vegetable matter by the addition of the $CO_2$-extract dissolved in $CO_2$ before, during or after the concentration of the aqueous extractives. The $CO_2$ is then removed.

---

This invention relates to the preparation of extracts from vegetable materials, for example coffee, tea or chicory, and, more particularly, to the preparation of coffee extracts.

Coffee extracts are generally sold in the form of powders obtained by drying the product obtained by the aqueous extraction of roasted coffee by means of spray dryers or by freeze drying. Although the following specification refers specifically to the preparation of powdered coffee extracts, it is obvious that the invention can also be applied to the preparation of aromatised coffee extracts either in paste or in liquid form.

The invention particularly relates to the preparation of extracts, such as extracts of roasted coffee, enriched with volatile aromatic constituents which give the reconstituted product both the aroma and the flavour peculiar to the beverage generally known as coffee prepared from grains of a high-grade, freshly roasted and ground coffee.

The present invention provides a process for the preparation of extracts from vegetable materials which comprises adding to an extract of a vegetable material a solution of at least the volatile aromatic constituents of that material in solution in carbon dioxide, and eliminating at least the carbon dioxide diluent by sublimation.

Since the end product is preferably a powdered coffee extract, both the volatile aromatic constituents and the fatty constituents of roasted coffee in solution in carbon dioxide are desirably added to the coffee extract obtained by aqueous extraction either before or after drying.

According to one particular embodiment of this process, the volatile aromatic constituents, and if desired, the fatty constituents, are initially extracted from a least one batch of roasted coffee in the course of one or more extraction cycles involving stripping with carbon dioxide in either the liquid or the gaseous phase, followed by aqueous extraction of the solids from the aforementioned batch, whereafter the carbon dioxide solution of the constituents is added to the aqueous extract thus obtained which may either be in liquid or in powder form. Finally, at least the carbon dioxide is removed by sublimation.

The invention also relates to the extracts obtained by the process herein described.

For the sake of clarity, the process may be divided arbitrarily into two phases, that is to say the preparation of the solution of the aromatic constituents in carbon dioxide, and the aromatisation of the extracts.

PREPARATION OF THE SOLUTION OF THE AROMATIC CONSTITUENTS IN CARBON DIOXIDE

The method which appears most advantageous for recovering the volatile aromatic constituents and optionally the fatty constituents from roasted coffee comprises directly extracting these constituents by stripping with a stream of carbon dioxide.

An apparatus in which such extraction may suitably be carried out is diagrammatically illustrated by the way of example in the accompanying drawing.

Referring now to the drawing, the apparatus comprises a pipe 1 connected to a source of gaseous carbon dioxide ($CO_2$), a heater 2, a double-jacketed tubular extractor 3, a condenser 4, an upper reservoir 5, a double-jacketed pipe 6 and a lower reservoir 7. The heater 2 and the extractor 3 are connected in a heating circuit shown in dashed lines (– – – –). The extractor 3, the condenser 4, the reservoirs 5 and 7 and the pipe 6 are all connected in a liquid coolant circuit shown in dash-dot lines (–·–·–·).

The complete apparatus is capable of being placed under an inert gas pressure by opening one or other of the valves 8 or 9.

In a first embodiment, a batch of roasted and ground coffee which has been moistened (moisture content 5 to 20% by weight) is introduced into the extraction column 3. The complete apparatus is put under pressure by opening the valve 8 which controls the admission of inert gas, for example nitrogen. When the pressure reaches the required level, which is preferably in excess of 10 atmospheres, the valve 8 is closed. The valve admitting gaseous carbon dioxide into the pipe 1 is then opened. The gaseous carbon dioxide is preheated to a temperature from 35 to 60° C. in the heater 2. The preheated gas is conducted to the bottom of the extractor 3 and flows through the batch of roasted coffee so as to strip and extract its volatile aromatic constituents. Since a heating liquid is circulating in the double jacket surrounding the extractor, extraction takes place at a temperature between 80 and 110° C. After leaving the extractor 3, the gas enriched with aromatic substances then flows into the condenser 4 where the mixture is condensed at a temperature around 0° C., after which the liquid solution of the volatile aromatic constituents of the roasted coffee flows into the upper reservoir 5 which is also cooled to around 0° C. Finally, the solution is conducted through the pipe 6 whose double jacket is kept filled with a liquid coolant to prevent excessive evaporation of the carbon dioxide, to the reservoir 7 where the solution is available for the aromatisation of a coffee extract.

In a second embodiment, the gaseous carbon dioxide is warmed in the heater 2 and then passes directly into the condenser 4 where it is condensed. The resulting liquid $CO_2$ is fed to the top of the extractor 3 which contains a batch of roasted and ground coffee. The double jacket surrounding the extractor is kept filled with a liquid coolant which maintans the extractor at a temperature equal to or slightly below 0° C. By flowing through this batch, the stream of liquid carbon dioxide strips the volatile aromatic constituents and some of the fatty constituents of the roasted coffee. The resulting solution of these constituents in the carbon dioxide is then fed to the lower reservoir 7 where it is stored.

In one preferred embodiment, the aromatic volatile constituents of the coffee are first of all extracted as described above by stripping with gaseous carbon dioxide and, after the enriched gas has been condensed, the solution of the aromatic constituents in liquid carbon dioxide is stored in the reservoir 7. The flow of heating liquid into the extractor 3 is stopped and its double jacket is emptied. The extractor is then connected to the liquid coolant circuit and, when the desired temperature, i.e. approximately 0° C., has been reached more gaseous carbon dioxide is admitted into the apparatus through the pipe 1.

The warmed gas flows directly through the pipe 6 into the condenser where it is condensed. It is collected as a liquid in the upper reservoir where its volume is checked and it is then fed to the head of the extractor 3 for second extraction, this time in the liquid phase, of the batch of roasted coffee. The aromatic and fatty fractions removed by the stream of liquid carbon dioxide are added to the product of the first extraction in the lower reservoir 7. The mixture of the two solutions is then ready for the aromatisation of a coffee extract.

The batch of coffee extracted by one or other of the methods described in the foregoing is removed from the extractor 3 and placed in one of the cells of a group of percolators or in any other apparatus suitable for the aqueous extraction of solids from roasted coffee.

In yet a further embodiment, the carbon dioxide solution of aromatic constituents may be prepared by extraction of an aqueous solution of such constituents obtained by steam-stripping either of moistened roast and ground coffee, or of an aqueous suspension of roast and ground coffee.

The aqueous solution is added to a suitable quantity of liquid carbon dioxide in a pressurised tank, for example in reservoir 7. To promote the liquid-liquid extraction, the aqueous solution may for example be saturated with sodium chloride. The two immiscible phases are preferably emulsified and, after separation of the layers, the spent aqueous solution is discarded. The carbon dioxide solution, enriched with the volatile aromatic constituents of roasted coffee, is stored under pressure in a suitable reservoir and is available for the aromatisation of coffee extract.

AROMATISATION OF COFFEE EXTRACTS

The addition of a carbon dioxide solution of the volatile aromatic constituents and, optionally, the fatty constituents of roasted coffee, to an extract of the same material can be carried out by various methods.

In a first embodiment of the process according to the invention, this solution is added to a coffee extract obtained by aqueous extraction before the extract itself is dried. The extract is preferably concentrated before the addition, whilst the solution is mixed with the concentrated extract in a chamber kept at a pressure which is not below the pressure of the triple point of carbon dioxide, i.e. 5.11 kg./cm.$^2$.

Spontaneous sublimation of the carbon dioxide is achieved by decreasing the pressure. Sublimation is selective because the volatile constituents and optionally the fatty constituents are intimately mixed with the solids obtained by aqueous extraction. In this way, a coffee extract can be aromatised in depth, as opposed to the superficial aromatisation obtained, for example, by spraying aromatic fractions bonded to an oily carrier on to particles of a dry powder.

A cooled or partly solidified foam is preferably formed by a gradual and controlled reduction in the pressure on the mixture until it is at atmospheric pressure. This foam is spread either over a belt or over trays in order to freeze it or to promote its freezing. In this way, a solid product is obtained which is broken down and ground into a powder with a particle size of, for example, 0.25 to 2 mm. This powder is spread out on trays and dried in a freeze-drying chamber. The process which has just been described may be carried out in a continuous cycle.

The end product is in the form of a dry powder having the appearance of ground coffee beans. After reconstitution, this extract, which has been aromatised in depth because the powder is impregnated, right down to the core of the particles, with fatty fractions which cannot be extracted with water and volatile aromatic constituents which have been restored to it, has both the aroma and the flavour of a high-quality coffee prepared from freshly roasted and ground coffee beans.

The solution of the aromatic constituents in carbon dioxide may also be added to a powdered coffee extract.

According to another embodiment of the invention, the aforementioned solution is brought to normal pressure by means of one or more spray nozzles arranged opposite a falling curtain or film of powdered coffee extract particles obtained by spray- or freeze-drying. The fine particles of "snow" issuing from the nozzles settle on the powder. By exposing the product to air, the carbon dioxide sublimes gradually, leaving traces of the volatile and fatty constituents of the roasted coffee over the surface of the powdered extract particles. This process may also be carried out in a continuous cycle.

The same applies to the process constituting the third embodiment. This process comprises coating the particles of a powder obtained from a coffee extract by spray- or freeze-drying, with the carbon dioxide solution in liquid phase. The powder can be spread out, for example in the form of a thin layer either on trays or on a conveyor belt within a chamber inside which a pressure of at least 5.1 atms. is maintained. The carbon dioxide solution of the volatile and fatty constituents of the roasted coffee is sprayed onto the powder which is then brought to normal pressure. The frozen envelope formed around the particles of powder by the carbon dioxide sublimes gradually, depositing the desired aromatic and fatty constituents onto the surface of the particles.

According to one modification of the process described above, the powdered coffee extract is placed in a container in which it is impregnated under sufficient pressure, either by trickling or by admixture, with a predetermined quantity of the liquid solution of the aromatic and fatty constituents of the roasted coffee. The mixture is then frozen solid either by reducing the pressure, or by cooling and reducing the pressure. When exposed to atmospheric pressure, the carbon dioxide diluent sublimes gradually, leaving the constituents on the surface of, and even within, the bulk of the particles of aromatised extract.

The process according to the invention is illustrated by the following examples, although it is not in any way limited to the conditions set out in them.

Example 1

1000 g. of roasted coffee, ground to a particle size of around 1 mm. are moistened with 100 g. of water and then placed in a double-jacketed tubular extractor. The apparatus operates as a closed circuit, and the pressure is raised to 20 atms. by the admission of gaseous nitrogen. The temperature of the extractor is raised to 95° C. by circulation of boiling water in its jacket, and a stream of carbon dioxide gas preheated to 45° C. is passed through the batch of coffee for a period of about 40 minutes. The gas enriched with the volatile constituents of the coffee is condensed at 0° C. Approximately 3 litres of solution are collected and stored in a reservoir cooled to 0° C.

The same batch of coffee is subjected to a second extraction cycle as follows: the double jacket surrounding the extractor is completely emptied and the boiling water is replaced by a chilled brine solution so as to lower the temperature of the batch to slightly below 0° C. Gaseous carbon dioxide is rapidly condensed at around 0° C. in a quantity sufficient to give approximately 5 litres of liquid carbon dioxide which is fed into the extraction column. Extraction is completed in 20 minutes, and the liberated volatile and fatty constituents in solution in liquid carbon dioxide, are fed to said reservoir where they are mixed with the volatile constituents obtained by the first extraction.

900 g. of the carbon dioxide solution prepared as described above are added under pressure and at 0° C. to 1000 g. of a coffee extract obtained by aqueous extraction and concentrated to a solids content of 45% by weight. The mixture is stirred thoroughly to form a stable emulsion and then the pressure is gradually lowered to atmospheric pressure. The product is in the form of a cooled foam which is frozen rapidly into a relatively thin layer. The solidified extract is then broken up and ground into a powder with a particle size from 0.25 to 2 mm. Finally, this powder is spread on a tray and dried in a conventional freeze-drier.

The aromatised extract, in the form of a dry powder, resulting from the process described above has a specific gravity of 0.23 to 0.25 g./cm.$^3$. It has the appearance of a powder of roasted and ground coffee beans. The product is "instant" and, after reconstitution with a suitable quantity of boiling water, provides a beverage having both the aroma and flavour of one prepared from freshly roasted and ground coffee beans.

Example 2

A solution of the volatile and fatty constituents of roasted coffee in carbon dioxide is prepared as described in Example 1.

1500 g. of this liquid solution are sprayed onto 1000 g. of a freeze-dried powdered coffee extract spread out in an extremely thin layer over a conveyor belt passing through a chamber maintained under a pressure of approximately 8 atms. The powder contacted with the particles of solution is then exposed to atmospheric pressure, and the carbon dioxide is left to sublime gradually until it has almost completely disappeared.

The aromatised product is in the form of a dry powder having a specific gravity from 0.2 to 0.3 g./cm.$^3$ and of characteristics similar to those of the material obtained according to Example 1.

Example 3

1500 g. of a solution of the volatile and fatty constituents of roasted coffee in carbon dioxide prepared as described in Example 1, are deposited onto 1000 g. of a spray-dried powdered coffee extract. The extract to be aromatised is distributed by means of a device which enables the powder particles to fall in the form of a circular curtain or film, and the solution, restored to atmospheric pressure by passage through one or more spray nozzles, is projected as snow onto the extract particles. The carbon dioxide is left to sublime at atmospheric pressure until it has almost completely disappeared, leaving a dry powder having a specific gravity from 0.20 to 0.25 g./cm.$^3$.

The resulting aromatised coffee extract has an extremely pleasant aroma and flavour.

Example 4

1 litre of a solution of volatile aromatic constituents of roasted coffee, obtained by steam stripping either of moistened roast and ground coffee or of an aqueous suspension of roasted and ground coffee, is charged into a tank.

This tank is maintained under an inert gas pressure of 50 atms. and about 4 litres of condensed liquid carbon dioxide are added to the solution. The two immiscible phases are maintained emulsified together for 15 minutes. To facilitate liquid-liquid extraction, it is advantageous to saturate the solution with crystalline sodium chloride.

After separation of the layers the spent, aqueous solution, which is heavier than liquid carbon dioxide, is drawn off from the bottom and discarded.

The carbon dioxide solution, enriched with the volatile aromatic constitutents of roasted coffee is maintained under a pressure of about 40 atms. It may be used for the aromatisation of coffee extracts by any of the processes described in the preceding examples.

We claim:

1. Process for the preparation of a vegetable extract which comprises extracting a vegetable material selected from the group consisting of coffee, tea and chicory with liquid carbon dioxide to remove aromatic and fatty principles, combining said liquid carbon dioxide extract with an aqueous extract of said material at a pressure above the triple point pressure of said carbon dioxide extract, freezing the combined extracts and freeze drying the combined extracts.

2. Process according to claim 1 wherein the vegetable material is coffee.

3. Process according to claim 1, wherein the extraction of the vegetable material takes place at a temperature between +1° C. and −15° C.

4. Process according to claim 1, wherein the aqueous extract is concentrated before combining with the carbon dioxide extract.

5. Process according to claim 1, wherein prior to extraction with liquid carbon dioxide volatile aromatic constituents are stripped from the vegetable material with gaseous carbon dioxide and condensed, and the condensed volatile aromatic constituents are added to the liquid carbon dioxide extract.

6. Process according to claim 5, wherein the volatile aromatic constituents are stripped from the vegetable material at a temperature between 80° C. to 110° C.

7. Process according to claim 5, wherein the vegetable material is moistened before the volatile aromatic constituents are stripped therefor.

8. Process according to claim 1, wherein the frozen combined carbon dioxide and aqueous extracts are ground prior to freeze drying.

9. Process according to claim 1, wherein the combined carbon dioxide extract and aqueous extract is converted into a foam by controlled reduction of pressure, the resulting foam is frozen and ground, and the ground foam is freeze dried.

10. Process for the preparation of a vegetable extract which comprises extracting a vegetable material selected from the group consisting of coffee, tea and chicory with liquid carbon dioxide to remove aromatic and fatty principles, impregnating particles of a freeze dried aqueous extract of said vegetable material with said liquid carbon dioxide extract, freezing the impregnated particles and subliming the carbon dioxide therefrom.

11. Process according to claim 10, wherein the vegetable material is coffee.

12. Process according to claim 10, wherein the extraction of the vegetable material takes place at a temperature between +1° C. and −15° C.

13. Process according to claim 10, wherein prior to extraction with liquid carbon dioxide volatile aromatic constituents are stripped from the vegetable material with gaseous carbon dioxide and condensed, and the condensed volatile aromatic constituents are added to the liquid carbon dioxide extract.

14. Process according to claim 13, wherein the volatile aromatic constituents are stripped from the vegetable material at a temperature between 80° C. to 110° C.

15. Process according to claim 13, wherein the vegetable material is moistened before the volatile aromatic constituents are stripped therefrom.

16. Process according to claim 10, wherein the impregnated particles are frozen by evaporation of the liquid carbon dioxide.

17. Process according to claim 10, wherein the impregnation step is carried out at a pressure above the triple point pressure of the liquid carbon dioxide extract.

18. A process for the preparation of extracts from vegetable material taken from the group consisting of coffee, tea, and chicory which comprises steam-stripping volatile aromatic constituents from the vegetable material and condensing an aqueous solution of said constituents to form a condensate, extracting said constituents from said condensate by mixing under pressure with liquid carbon dioxide, adding the extracted constituents and liquid carbon dioxide to an aqueous extract of said vegetable material, and then removing the carbon dioxide by sublimation.

19. A freeze dried aqueous extract of a vegetable material selected from the group consisting of coffee, tea and chicory prepared by the process of claim 10.

References Cited

UNITED STATES PATENTS

| | | | |
|---|---|---|---|
| 2,738,276 | 3/1956 | Blench | 99—71 |
| 1,817,908 | 8/1931 | Belt | 23—150 X |
| 2,345,378 | 3/1944 | Brandt | 99—71 |

OTHER REFERENCES

Rey, L., Experientia, vol. 21, No. 5, 1965, pp. 241–246. Copy in Scientific Library.

MAURICE W. GREENSTEIN, Primary Examiner

U.S. Cl. X.R.

34—5; 55—68; 99—73, 77